April 25, 1944.　　　　S. T. SMITH　　　　2,347,295
SINGLE BAR SHAFT COUPLING
Filed May 4, 1942　　　　3 Sheets-Sheet 1

INVENTOR.
Skardon T. Smith
BY Myron J. Diksman
ATTORNEY

April 25, 1944.                    S. T. SMITH                    2,347,295
                            SINGLE BAR SHAFT COUPLING
                              Filed May 4, 1942            3 Sheets-Sheet 2

INVENTOR.
Shardon T. Smith
BY Myron J. Diksman
                ATTORNEY

April 25, 1944.          S. T. SMITH          2,347,295
SINGLE BAR SHAFT COUPLING
Filed May 4, 1942          3 Sheets-Sheet 3

INVENTOR.
Skardon T. Smith
BY Myron J. Dikeman
ATTORNEY

Patented Apr. 25, 1944

2,347,295

UNITED STATES PATENT OFFICE 2,347,295

SINGLE BAR SHAFT COUPLING

Skardon T. Smith, Detroit, Mich.

Application May 4, 1942, Serial No. 441,672

2 Claims. (Cl. 192—45.1)

This invention relates to an improvement of my former locking device described in Patent No. 1,835,349, dated Dec. 8, 1931, and herein provides means for adapting the locking bar to an automatic shaft coupling unit.

The object of my invention is to provide a drive shaft coupling adapted for free wheeling of one shaft section whenever an excessive rotating force is applied in one direction, through the driven unit.

Another object is to provide a shaft coupling capable of automatically locking the shaft sections together when a rotating force is applied thereto through the driving shaft unit, but will release the connected shaft section if an excessive rotation force in the same direction is applied through the opposite shaft section.

A further object is to produce an automatic coupling simple in construction, easily and effectively applied to any line shaft, and that can be manufactured at a very low cost.

These several objects are attained in the preferred form by the construction and arrangement of parts more fully hereinafter set forth.

Similar parts on all drawings are marked by similar numerals or letters.

Figure 1:
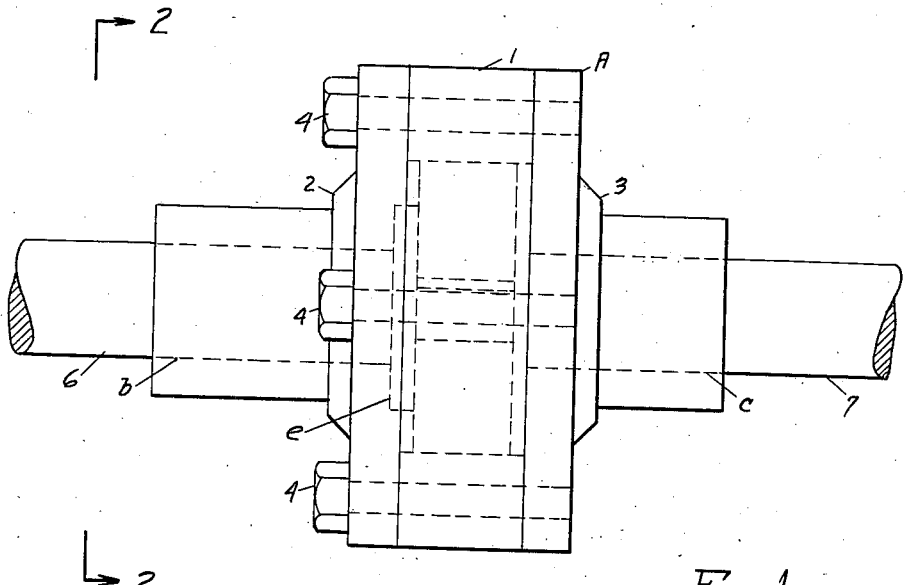
Fig. 1 is an elevation of the coupling showing the general application to adjoining shaft sections.
Figure 2:
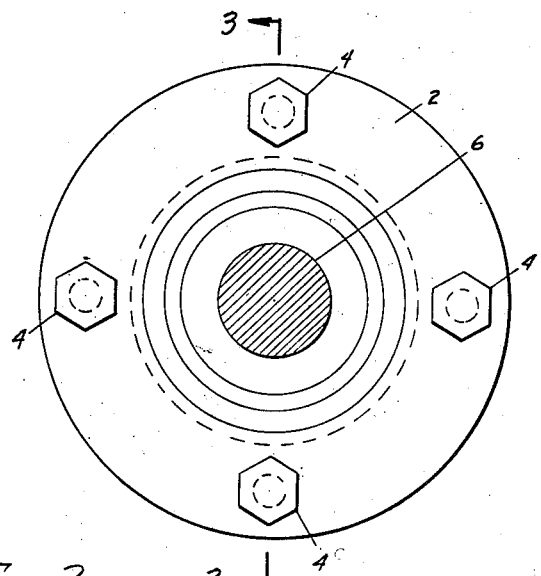
Fig. 2 is an end view taken on the line 2—2 of the Fig. 1 showing the formation of the coupling housing.
Figure 3:
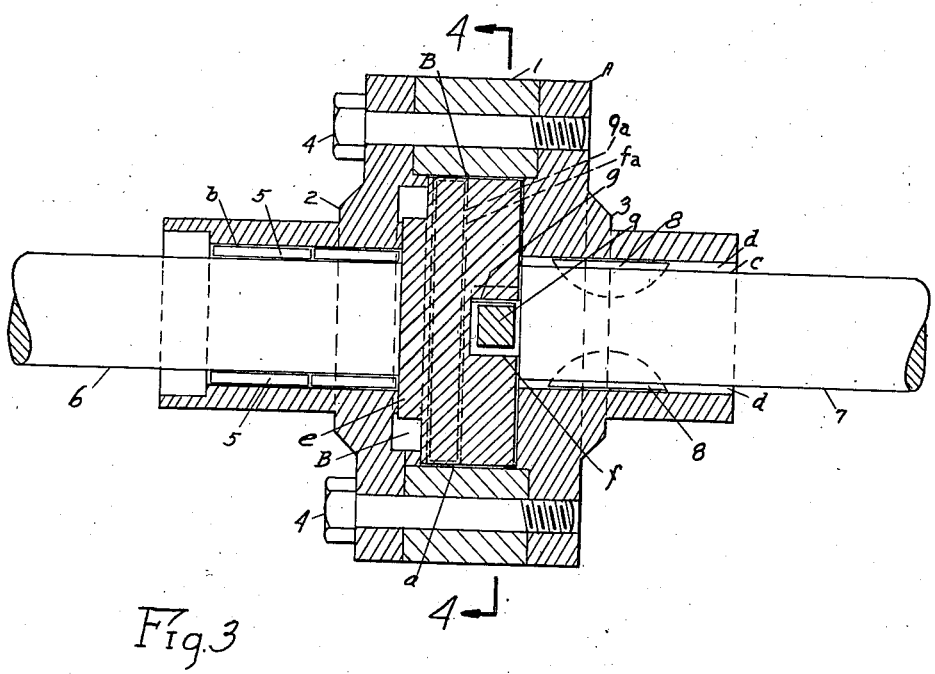
Fig. 3 is a sectional view, except for the central shaft sections, taken on the line 3—3 of the Fig. 2, showing the general arrangement of the operating parts.

In general, my device comprises a cylindrical housing casing formed with concentric shaft bearings leading into opposite ends thereof. The housing is fixedly attached to the driven shaft unit, while the driving shaft section is rotatably mounted in the opposite bearing recess, and is provided with a slotted hubbed end interposed within the casing recess, designed to engage and displace a special lock bar mounted within said slot, and in a manner to lock same with the inclosing housing when so displaced under pressure.

I will now describe more fully the detailed construction of my device, referring to the drawings and the marks thereon.

The housing A is preferably formed of a cylindrical brake ring 1 having end housing caps 2 and 3 securely attached thereto by suitable stud bolts 4. The brake ring 1 is formed a true cylindrical section, preferably with a hardened and ground cylindrical inner surface a. Both end housing caps 2 and 3 are likewise turned cylindrical sections formed with cylindrical shaft recesses b and c respectively, positioned concentric with the connecting brake ring axis. The shaft recess b of the end cap 2 is a bearing unit, and preferably is provided with suitable roller bearings 5 for receiving, rotatably, the driving shaft section 6 therein. The opposite end cap shaft recess c is fixedly mounted on the end of the driven shaft section 7, by means of the keys 8 engaged in the splined groove d formed within the end cap collar, thus causing the assembled housing A to rotate with the shaft section 7 as an integral unit thereof, while the opposite driving shaft section 6 is free to rotate within the housing bearing 5. The driving shaft 6 is retained in a pre-determined position within the housing by means of the attached end disc drum e rotatably mounted within the housing chamber B. The disc drum e is provided with a recess f positioned diametrically thereacross, formed with a driving contact point g near one end thereof, and with diagonally opposing centralizing contact shoulders h and k. Within the drum slot f is loosely mounted a rectangular lock bar 9, formed with cylindrical ends x of a diameter slightly less than the inclosing brake ring 1, thus allowing a slight sidewise displacement therein transversely of the shaft axis, designed for forming contact with the ring inner surface a at a pre-determined locking angle whenever so displaced by an eccentrically applied pressure. The bar 9 is also designed to engage the centralizing contact shoulders h and k for retaining same in a concentric position free to rotate within the housing chamber.

Figure 4:
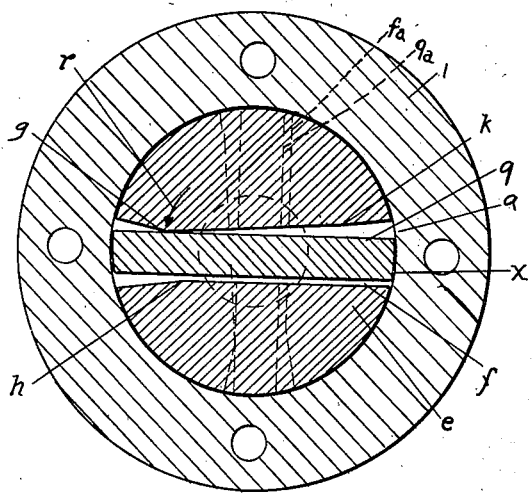
Fig. 4 is a cross-sectional view taken on the line 4—4 of the Fig. 3, showing the relative position of the driving unit and interposed lock bar.
Figures 5, 6:
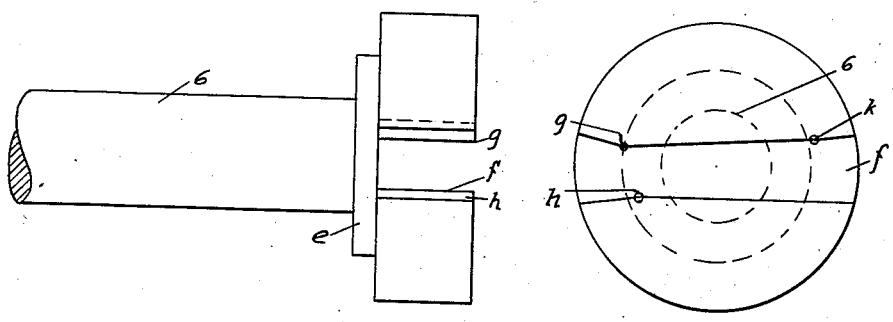
Figs. 5 and 6 show details of the driving shaft hub unit.
Figures 7, 8:
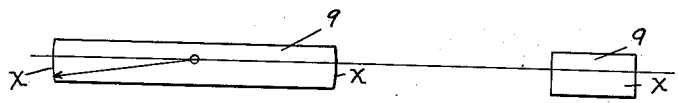
Figs. 7 and 8 show the details of the special lock bar.

It can readily be seen that any rotating force applied through the driving shaft section 6 and connected drum e in the direction as indicated by the arrow r of Fig. 4, will forcibly displace the lock bar 9 sidewise within the housing chamber and rigidly lock with the inner walls a, thus rotating the housing A and the connected shaft section 7 as a single unit. However, if the rotating force in the same direction be applied through the driven shaft section 7, the lock bar 9 will be engaged by the centralizing shoulders h and k and automatically be displaced to a centralized position, and allow the driven shaft section and housing to rotate freely thereon. The result would likewise be the same if the driving shaft 6 should be stopped while the unit was in motion, and the shaft 7 with housing would continue to rotate.

Additional bars may also be added within the disc drum e as bar 9a indicated by the dotted lines shown in the Fig. 4 of the drawings by elongation of the drum section e and inclosing housing casing brake ring l, and providing an added recess opening fa therethrough in an adjacent axial plane, positioned at righ tangles thereto.

Having fully described my single bar shaft coupling, what I claim as my invention and desire to secure by Letters Patent is:

1. A lock bar shaft coupling adapted for automatically releasing a connected shaft section when an excessive rotating force is applied therethrough, comprising a housing casing formed with a central cylindrical recess chamber provided with connected shaft recesses through opposite ends thereof positioned concentric with the chamber axis, a driving shaft section rotatably mounted through one housing end recess, a driven shaft section fixedly mounted within the opposite housing recess and made integral therewith, said driving shaft section being formed with a cylindrical drum head on the inner end thereof rotatably mounted within the housing chamber, said drum head being slotted diametrically forming a driving contact point on one side wall and a pair of oppositely disposed centralizing shoulders engageable in the opposite directional rotation, a lock bar formed with circular ends rotatably mounted within the housing chamber within the drum head slot, said lock bar being designed and positioned to engage the chamber walls at a predetermined locking angle and lock therewith when so displaced under pressure applied through the driving shaft section, but will be released and centralized within the chamber recess whenever an excessive rotating force is applied in the same direction through the connected driven shaft section.

2. A multiple lock bar shaft coupling adapted for automatically releasing a connected driven shaft section when an excessive rotating force is applied through the driven section, comprising a housing casing formed with a central cylindrical chamber provided with connected shaft recesses leading through opposite ends thereof concentric with the chamber axis, a driving shaft section rotatably mounted through one housing shaft recess, a driven shaft section fixedly mounted through the opposite end shaft recess and made integral with the housing, said driving shaft section being formed with a cylindrical drum head on the inner end thereof rotatably mounted within the housing chamber, said drum head being formed with diametrically positioned bar slots uniformly disposed across the drum head section, each slot being formed with a driving contact point one one side wall near the slot end and a pair of oppositely disposed centralizing shoulders engageable in the opposite directional rotation, a lock bar formed with circular ends mounted within each of said drum head slots and rotatably within the housing chamber, each of said bars being designed and positioned to engage the chamber walls at a predetermined locking angle and lock therewith under pressure applied through the driving shaft section, but will be released from the chamber walls and centralized within the chamber recess whenever an excessive rotating force in the same direction is applied thereto through the driven shaft section.

SKARDON T. SMITH.